(12) United States Patent
Hoopes

(10) Patent No.: US 7,755,216 B2
(45) Date of Patent: Jul. 13, 2010

(54) UNINTERRUPTED POWER SUPPLY WITH IR CONTROL LINK

(75) Inventor: Gerald B. Hoopes, Petaluma, CA (US)

(73) Assignee: Panamax LLC, Petaluma, CA (US)

( * ) Notice: Subject to any disclaimer, the term of this patent is extended or adjusted under 35 U.S.C. 154(b) by 51 days.

(21) Appl. No.: 12/360,741

(22) Filed: Jan. 27, 2009

(65) Prior Publication Data

US 2009/0179497 A1 Jul. 16, 2009

Related U.S. Application Data

(63) Continuation of application No. 11/086,604, filed on Mar. 21, 2005, now abandoned.

(51) Int. Cl.
*H02J 7/00* (2006.01)
*H02J 3/32* (2006.01)

(52) U.S. Cl. .............................. 307/64; 307/48; 307/49; 307/66

(58) Field of Classification Search .................... 307/64
See application file for complete search history.

(56) References Cited

U.S. PATENT DOCUMENTS

| | | | |
|---|---|---|---|
| 5,287,210 A * | 2/1994 | Sefidvash | 398/111 |
| 5,534,734 A | 7/1996 | Pugh | |
| 6,107,698 A * | 8/2000 | Ochiai et al. | 307/43 |
| 2002/0052940 A1* | 5/2002 | Myers et al. | 709/223 |
| 2006/0146478 A1 | 7/2006 | Martin | |

* cited by examiner

*Primary Examiner*—Edward Tso
*Assistant Examiner*—Johali A Torres Ruiz
(74) *Attorney, Agent, or Firm*—Hogan Lovells US LLP

(57) ABSTRACT

A Universal Power Supply (UPS) protects audio/visual (A/V) components from damage that may occur due to a sudden power loss by first, providing back up power via a battery, and then initiating the normal, that is powered, shut down of the protected component via an infrared control signal. The infrared control signal is learned from the A/V components remote control unit.

20 Claims, 6 Drawing Sheets

UNINTERRUPTED POWER SUPPLY WITH IR CONTROL LINK

CROSS REFERENCE TO RELATED APPLICATIONS

This is a continuation of application Ser. No. 11/086,604, filed Mar. 21, 2005, which application is hereby incorporated by reference in its entirety.

BACKGROUND OF INVENTION

The present invention relates to a method of protecting audio-visual electronic equipment from damage to power loss, and in particular when such method utilizes an uninterrupted power supply (UPS)

Uninterrupted power supplies are frequently deployed for protecting computers from the loss of sensitive data that would be otherwise lost in a power failure. The UPS includes a back up battery coupled to a transformer to deliver the line voltage to the protected electronic equipment in the event that the direct line voltage is lost. As the battery has a finite life, during which the return of power can never be assured, the UPS also provides means to either alert the user that the equipment should be shut down as soon as can be safely done so, or automatically controls the equipment.

Prior methods of notifying the user or prompting an automatic shut down sequence require a sophisticated electronic interface between the UPS and the protected equipment.

Technical advances in audio/visual (A/V) equipment systems, and in particular in sophisticated home theater systems, have resulted in the deployment of visual displays and other equipment that can be damaged if power is turned off abruptly. Also of significance is the application of computer systems and home entertainment systems have become intertwined with the advent of digital recording technology and the ability of consumers to edit video for creating there own DVD's there is increasing need to prevent power losses to A/V equipment to avoid data loss.

While UPS systems have been developed that can automatically interface with the dominant operating systems used in personal computers, this is not the case for A/V equipment, as a larger number of OEM's each utilize largely proprietary firmware and software, generally without providing an interface for external control.

It is therefore a first object of the present invention to provide for the protection of A/V equipment susceptible to damage from an uncontrolled loss of power.

It is yet another object to provide such a UPS with a flexible response time

It is a further object to provide for such a UPS that can protect multiple A/V components.

SUMMARY OF INVENTION

In achieving the present invention, the inventor came to appreciate that while A/V equipment frequently lacks any or a universal electronic communication means to interface with a UPS, most A/V equipment comes equipped with a remote control system. This led to the realization that it should be possible to meet the unfulfilled needs of providing UPS technology to A/V systems by utilizing the remote control system as the interface between the UPS and the protected equipment. It further became apparent that although such remote control systems utilize proprietary infrared (IR) signal to communicate between the device and the controller, the recording, learning and mimicking of these signal could provide a practical control means if integrated into the functionality of the UPS device.

Therefore the first object of the invention has been achieved by providing a UPS device that comprises a battery, a power input port, a power output port, IR signal output port, IR signal input port, means to learn a signal pattern received at the IR input port, and means to send the learned IR signal via the output port in response to a loss in power at the power input port.

A second aspect of the invention is characterized in the UPS device includes means to send the learned signal via the output port in response to a low battery in the UPS.

The above and other objects, effects, features, and advantages of the present invention will become more apparent from the following description of the embodiments thereof taken in conjunction with the accompanying drawings.

DETAILED DESCRIPTION

Figure 1:
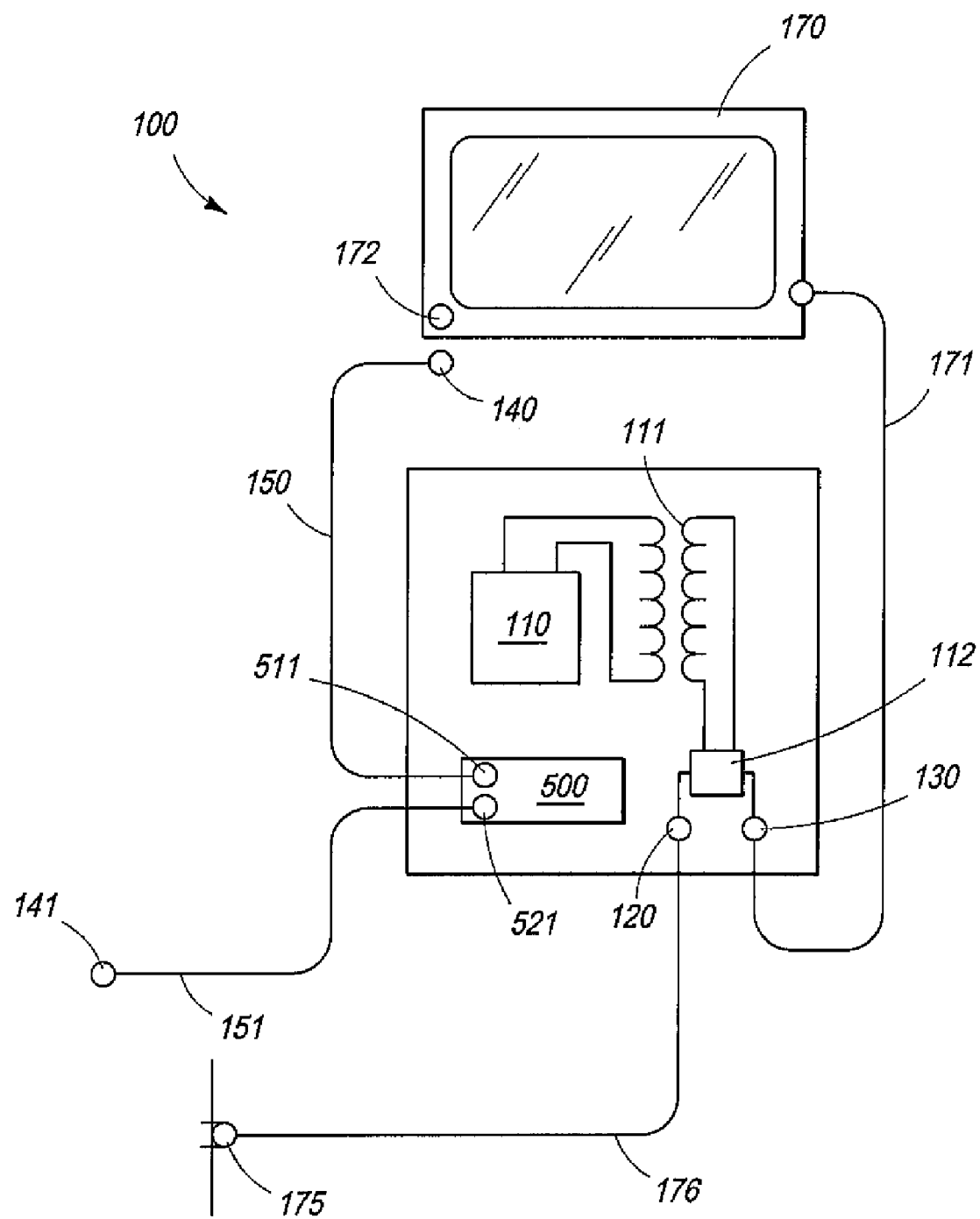
FIG. 1 is a schematic diagram of a UPS device as deployed in conjunction with an A/V system.

Referring to FIGS. 1 through 6, wherein like reference numerals refer to like components in the various views, there is illustrated therein a new and improved Universal Power System with Infrared Control Link, generally denominated 100 herein.

In accordance with the present invention, FIG. 1 illustrates the general operative conditions and environment of use of device 100. A visual display 170 has a main power cord 171, which connects to the power output port 130 of uninterrupted power supply (UPS) device 100. UPS device 100 receives AC power from the wall power socket 175 through the device power cord 176, which is connected in turn to the power input port 120. The basic operation and function of a UPS is well known for maintaining a connected back up battery 110 in a charged state. When UPS device 100 is normally energized via device power cord 176, the AC power flows to the power output port 130, and in turn to visual display device 170 via its power cord 171. However, when UPS device 100 senses a loss in power at the power input port 120, via a failure or transient in the main power supply that feeds wall socket 175, a switching circuit 112 is operative to convert the DC output of the battery 110, via transformer 111, to AC power at the same voltage as required by device 170, which is switched to supply power output port 130.

As the battery 110 has limited charge and hence back up duration, it is then desirable that the power is either restored, during which time the battery is re-charged, or the display 170 is powered down in the normal mode of operation. Specifically, in one embodiment of the invention, display 170 is powered down by an IR remote control signal it receives at its IR input port 172. By shutting down display 170 via the remote control subcomponents of display 170 that require power to safely turn off or protect other subcomponents during a shut down, are turned off when such power is still available from battery 110 of UPS device 100. For example in a Digital Light Projector (DLP) the lamp must be cooled by a fan after the lamp is turned off to prevent overheating. Thus, in operation the UPS device 100, would provide the back up power to the fan motor after its mimicking of the remote control powering down of the DLP such that the lamp can be cooled for the proper amount of time.

Accordingly, upon a loss or transient in the AC power into UPS device 100, in addition to providing battery back up, UPS 100 provides the requite IR remote control signal from IR output port 511. An IR emitting LED 140 is connected to IR output port 140 by signal cable 150. UPS device 100 may include a second IR output port 521. An IR emitting LED 141 is connected to IR output port 521 by signal cable 151.

It should be apparent that the UPS device 100, in order to provide the aforementioned function with a variety of display or A/V devices from different manufactures, must be able to generate IR remote control signals with the proper digital characteristics to be recognized by the display 100. That is, as UPS device 100 must act like of mimic the remote control for display 170.

Accordingly, in preferred embodiments UPS device 100 can not only provide protection to A/V components susceptible to damage from an uncontrolled loss of power, but is universality applicable to all types A/V components with remote controls Further, UPS device 100 preferably has multiple, independently programmable IR output ports so it can be used to protect multiple A/V components. The IR output ports are optionally a receptacle for providing power to a light emitting diode (LED) with an IR signal output, which would be connected via a cable to reach the separate IR input port of the protected A/V components Alternatively, such light emitting diode can be directly connected via a cable to UPS device 100. The cable is optionally a fiber optic cable when the actual LED device is within the case of the UPS device 100, or an electrical signal cable to power a remote IR generating LED. It should be understood that other devices and components that can generate the requisite IR signals are intended to be equivalent to an LED, although their technical characteristics of operation may be subject to characterization as other than a diode, such as lamps, lasers and the like.

Figure 2A:
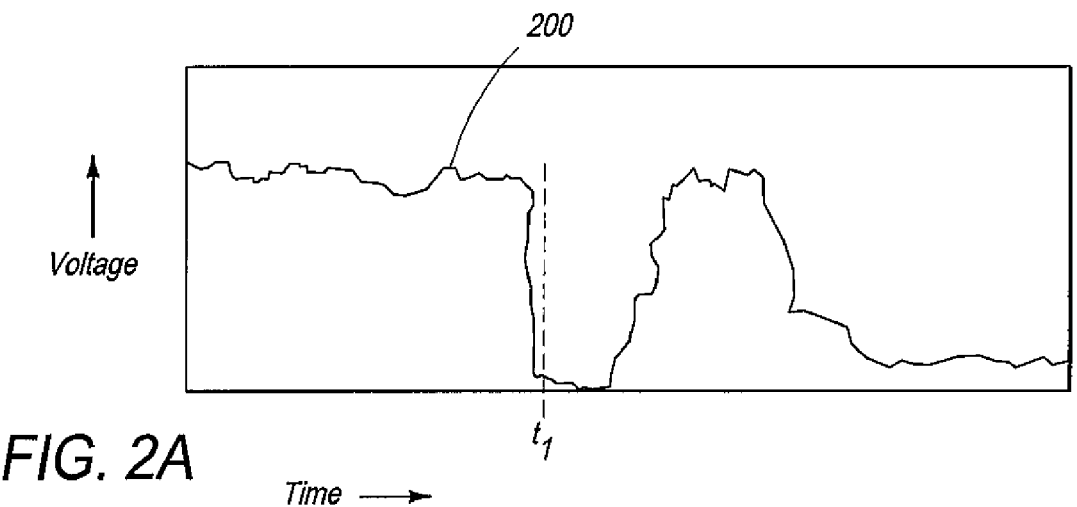
FIGS. 2 B and C are timing diagram showing the alternative sequence of alert signals in response to a power transient shown in FIG. 2A.
Figure 2B:
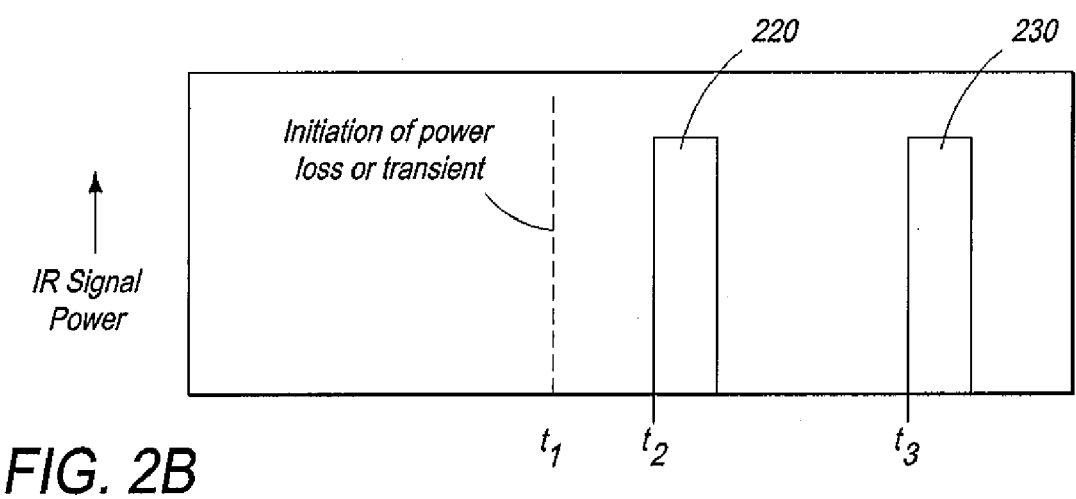

FIGS. 2A, B and C illustrate via a timing diagram a more preferred embodiment of UPS device 100 wherein the response time is variable at the control of the user to accommodate different types of A/V components and minimize false or unnecessary shut down sequences via IR signal output ports 511/512. As shown in FIG. 2A, the mains voltage has a hypothetical transient illustrated as line 200. At time $t_1$ the voltage drops to zero, or another low voltage conditions that would initiate the switchover of UPS device 100 to power display 170 from battery 110. Specifically, $t_2$ can be associated with IR output port 511 and $t_3$ can be associated with IR output port 521. These means to control one or multiple components shut down sequence can be redundant or staged. That is, non-critical components can be shut down immediately, in the first stage, to conserve battery power, whereas the more critical components, that require residual per during the normal shut down sequence can be shut down in a second stage. FIG. 2B shows a mode of configuring UPS device 100 to provide for such staged shut down. The first IR control signal, shown schematically as bar 220 at time $t_2$ is directed by porting the output of the first IR port to a first display or A/V component, whereas the second IR control signal, shown schematically as bar 230 at time $t_3$ is ported to a second A/V component.

Figure 2C:
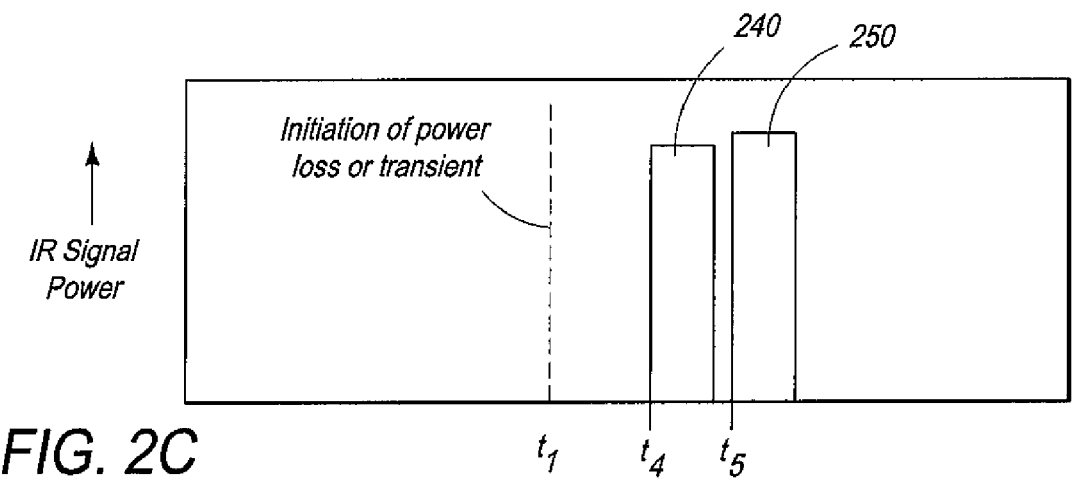
Figure 3:
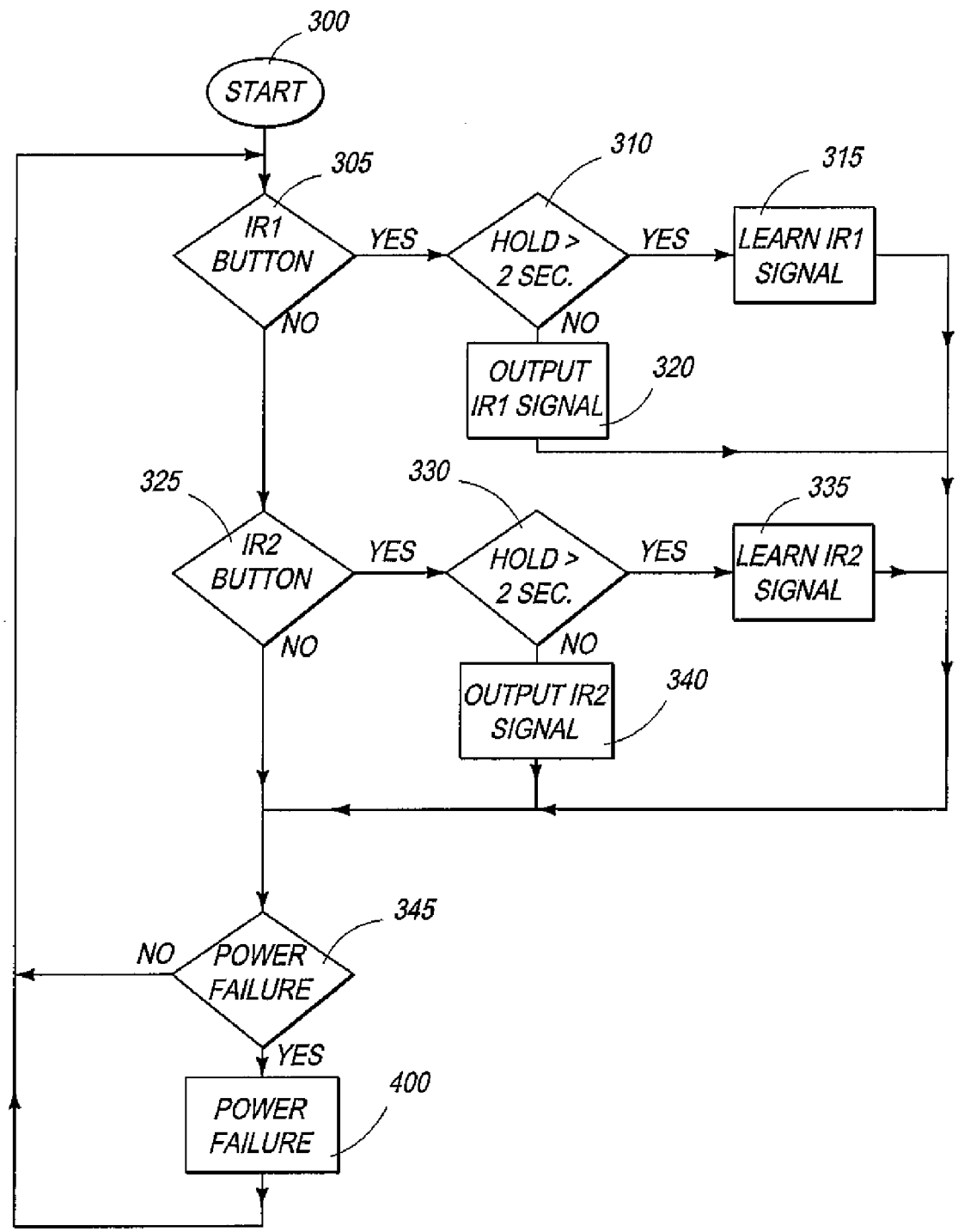
FIG. 3 is a first flow chart illustrated an embodiment of steps in programming the UPS device of FIG. 1 to respond as illustrated in FIG. 2

Alternatively, additional security may be provided by the redundancy of having the different IR output ports supply the same IR signal to the device in succession in case the first signal is not properly delivered or read by the display device 170. FIG. 2C shows an alternative mode of configuring UPS device 100 to provide for the redundant shut down of a single A/V device. A first IR control signal shown schematically as bar 240 at time $t_4$ is ported to the receiver of the A/V device. Then, several seconds later, a second IR control signal, shown schematically as bar 250 at time $t_5$, is ported to the same A/V device. The redundancy is achieved in that the first and second IR control signals originate from different output ports of the UPS device 100.

In the more preferred embodiments of the invention, both $t_2$ and $t_3$ are totally programmable with respect from initiating event $t_1$. For example, it may be desirable to increase $t_2$ such that very short transients, which may properly trip the UPS device 100, do not initiate the shut down of display 170 unless and until they either last a specified duration, or the battery is drained to a minimum critical level. This provides the ability to "ridethrough" brief power outages without sending a shutdown signal to the connected device. Accordingly, depending on the application and nature of the protected A/V components it is desirable to pre-select the output delay or time between $t_1$ and $t_2$ or between $t_1$ and $t_3$. Generally, appropriate selectable times for $t_2$ and $t_3$, with respect to the battery back up initiating event at $t_1$, are a delay of from about 30 second to about 5 minute.

Figure 5:
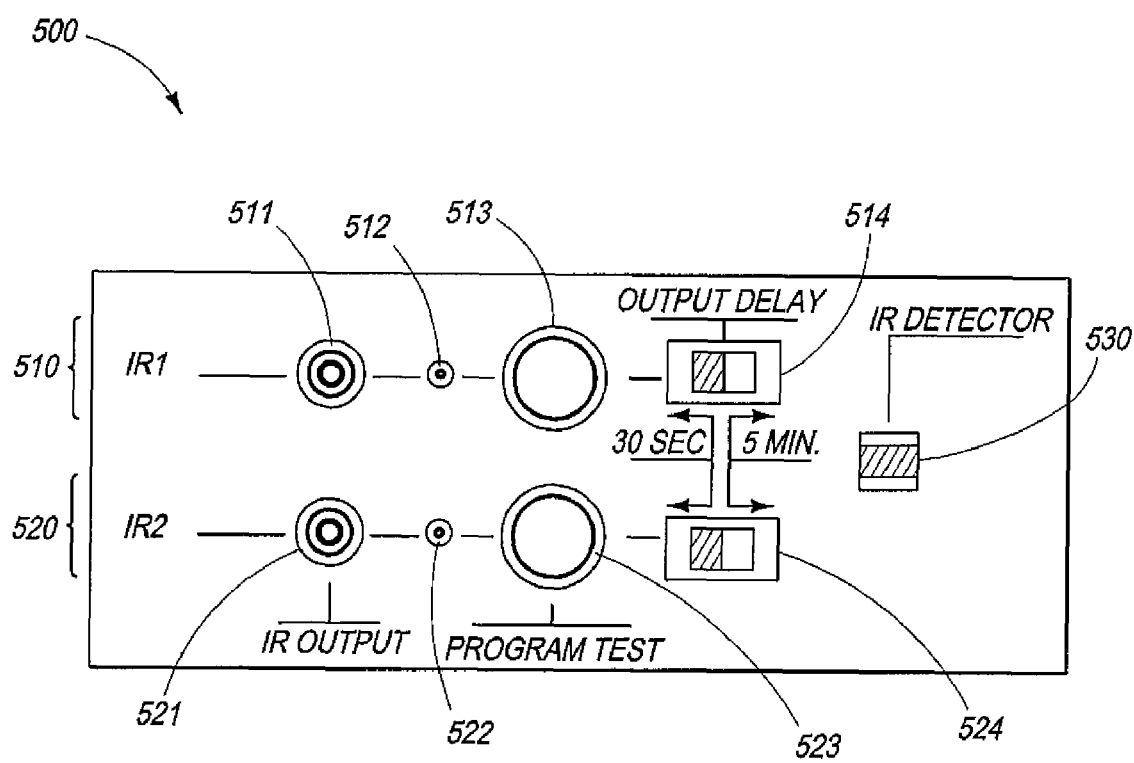
FIG. 5 is a diagram illustrating one embodiment of a control panel for programming and testing the IR signals and associated I/O devices in accordance with FIG. 3.

UPS device 100 also preferably includes a training mode to program the IR output signal to mimic the remote control associated with display device 170. The activation and set-up of the training mode is preferably operated by a switch on control panel 500, according to the method illustrated in logic diagram/flow chart of FIG. 3. One example of an accessible panel 500 is shown in FIG. 5. Other features of the panel 500 in FIG. 5 include a status indicator for each IR output port. Each status indicator is preferably a pair of contrasting colored LED supplied on an accessible panel of UPS device 100. I/O ports and control devices associated with the first IR signal are arranged in a horizontal row 510, and include an jack receiving IR output port 511, an LED indicator light 512, a program mode/test switch 513 and an output delay switch 514. I/O ports and control devices associated with the second IR signal are arranged in another horizontal row 520, and include an IR output jack port 521, an LED indicator light 522, a program mode/test switch 523 and an output delay switch 524.

As previously described, the output delay can be continuous controllable or discrete. However, in the embodiment shown in FIG. 5, the user is able to select between the discrete values of 30 sec. or 5 minutes for the time difference between $t_1$ and $t_2/t_3$ described in FIG. 2. In the training mode, the first and second IR signal from the remote control devices are received by UPS device 100 via a common IR detector port 530 having an IR sensitive photo-detector.

The user can independently train each of the first and second IR signals to mimic different device remote controls by depressing program mode/test switch 514 or 524 for greater than 2 seconds. This initiates the programming of the microprocessor 620 (shown in FIG. 6) according to the flow chart of FIG. 3. The color or state of the LED's 512 and 513 communicate the status of the logic circuitry of microprocessor 610, before, during and after programming of the respective first and second IR signals. When the corresponding LED status light is off the UPS device is idle.

Thus, on the panel 500 shown in FIG. 5, the program-test switch 513 associated with IR signal 1 (or the program test switch 523 associated with IR signal 2) is switched to the program position by depressing continuously for at least two seconds. Next, according to the logic diagram/flow chart of FIG. 3 at step 310 the learn mode is activated in step 315. In the learn mode the status light (512 in FIG. 5) is solid green to show that the device is waiting to receive an IR signal at IR detector port 530, indicating to the user that the desired IR remote control should be brought in close proximity to port 530 and activated in the usual manner for the conventional shut down of display device 170. The LED status light then responds by flashing green to indicate to the user that the external IR signal from the remote control device is being sampled. In contrast, when the LED status light is red and flashing UPS device 100 has failed to learn IR signal applied at IR detector port 530.

As an alternative to entering the training mode by depressing switch 513/523, the same switches may be depressed for less that 2 seconds to immediately send the last learned or programmed IR signal via the respective IR output ports. Thus, according to the logic diagram/flow chart of FIG. 3, at steps 310 and 320 depressing program mode/test switch 514 or 524 for less than 2 seconds activates the corresponding IR signal output at IR outlet port 511 or 521, providing a full function test of the IR output and protective function of the UPS device 100. This allows the user to immediately confirm the functionality of UPS device 100 without risking device damage in an actual power failure.

UPS device 100 continuously monitors the status of both the IR1 program mode/test switch 513, step 305 and the IR2 program mode/test switch 523 in step 325, such that if no power failure occurs the IR2 response signal is likewise programmed by depressing switch 523 for more than 2 seconds.

When programming steps 310, 315, 330 and 335 are completed, the device is operative to monitor for a power failure in step 345. If a power failure occurs the UPS device 100 is further operative to protect the A/V component or display 170 according to the logic diagram/flow chart of FIG. 4, corresponding to step 400 in FIG. 3. That is, after programming, when the UPS device 100 encounters a voltage transient, electrical circuit 600 is operative according to the control chart of FIG. 4.

Figure 4:
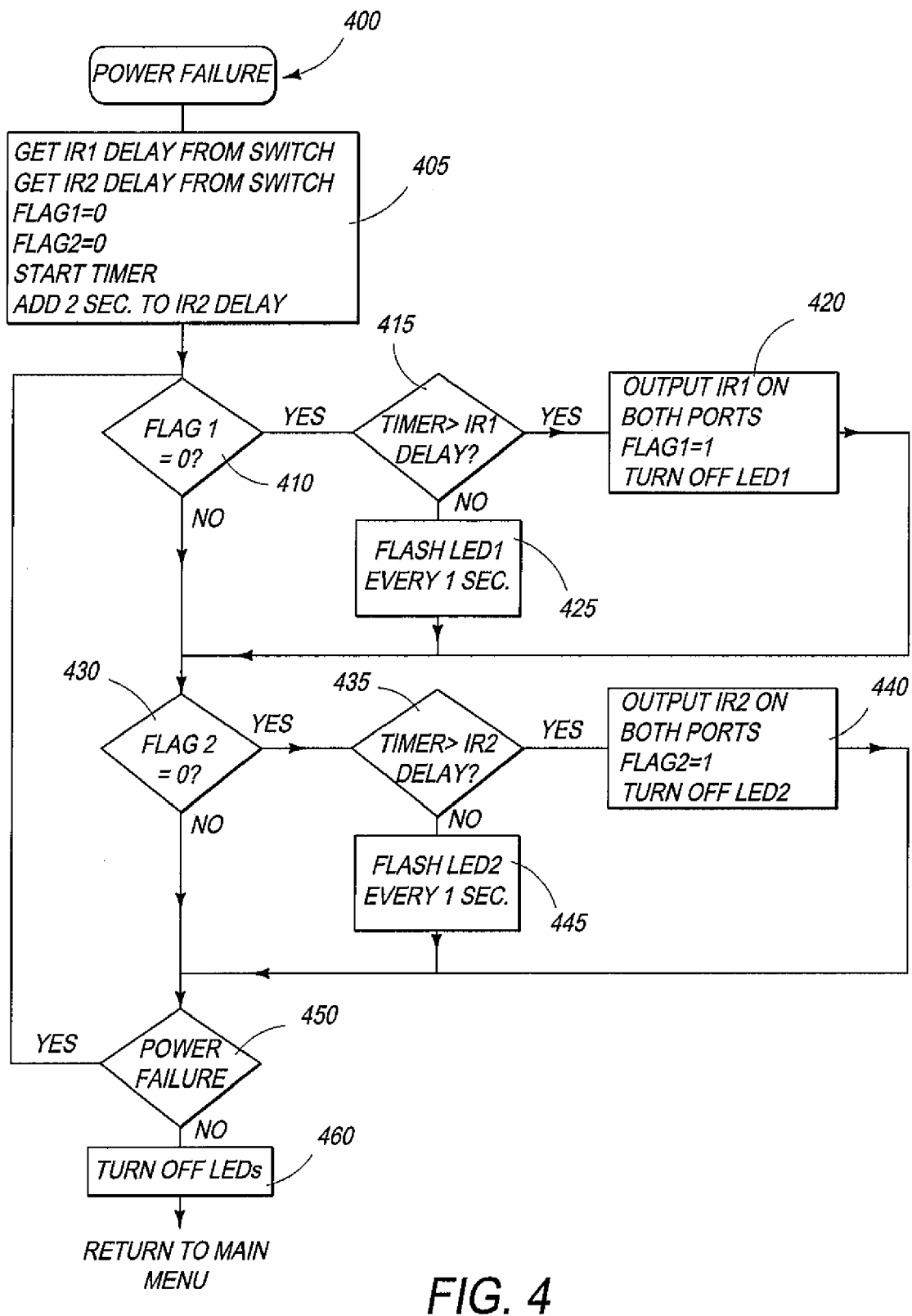
FIG. 4 is a second flow chart illustrating the function performed by the electrical circuit of FIG. 5, in providing the response of FIG. 2B or 2C.

In FIG. 4, flag 1 and flag 2 represent logic states associated with control of the IR signal response via microprocessor 610. Each flag is initially set at zero in step 405, which is initiated by a power failure, 400. In the same step 405 the control timer is started. The microprocessor 610 also obtains IR1 and IR2 delay times from the respective settings of switches 514 and 524 in this step. Further, in this step an additional 2 sec. delay is added to the IR2 time in case the user wishes to use the output from IR1 and IR2 ports 511 and 512 in a redundant mode, that is with the operative LED's controlled by the IR1 and IR2 ports pointed at the same A/V devices IR input port. The two-second delay assures that the protected A/V component will not be confused by overlapping signal should the delay time be set to the same values via switches 514 and 524. Alternatively, this also eliminates the possibly of signal confusion and cross-talk through reflections or scatter of the IR beam intended for one piece of A/V equipment with another intended to be controlled by the signal from the other IR output port of UPS device 100. When the flag 1 remains at zero, as measured at step 410, control switches to step 415. Step 415 tests if the elapsed time is greater than the IR delay programmed via switch 511. If so (yes), the control passes to step 420 in which the IR1 signal is output on both IR output ports 511 and 521. This also assures that the A/V devices will turned off even if the user has inadvertently switched the two LED's that communicate directly with the protected A/V devices. In the same step 420, Flag 1 is set to 1 and LED1 is turned off. If the time is less than the present IR delay then control passes to step 425, in which LED1 flashes every second. This indicates to the user that the UPS has detected a power loss and is supplying energy to the protected device via the battery, and that the protected A/V device will be shut down if the power outage continues.

Next, control eventually passes to step 430. When the flag 2 remains at zero, as measured at step 430, control switches to step 435. Step 435 tests if the elapsed time is greater than the IR delay programmed via switch 521. If so (yes), the control passes to step 440 in which the IR2 signal is output on both IR output ports 511 and 521. This also assures that the A/V devices will turned off even if the user has inadvertently switched the two LED's that communicate directly with the protected A/V devices. In the same step 440, Flag 2 is set to 1 and LED2 is turned off. If the time is less than the present IR delay then control passes to step 445, in which the LED2 flashes every second. This indicates to the user that the UPS has detected a power loss and is supplying energy to the protected device via the battery, and that the protected A/V device will be shut down if the power outage continues.

Next, control eventually passes to step 450. If the power failure has ceased then LED 1 and LED2 are turned off and control returns to the main device menu, 300 in FIG. 3. If the power failure conditions remains, control returns to step 410 and the monitoring of elapsed time versus the status of flags 1 and 2 continues as described above.

Figure 6:
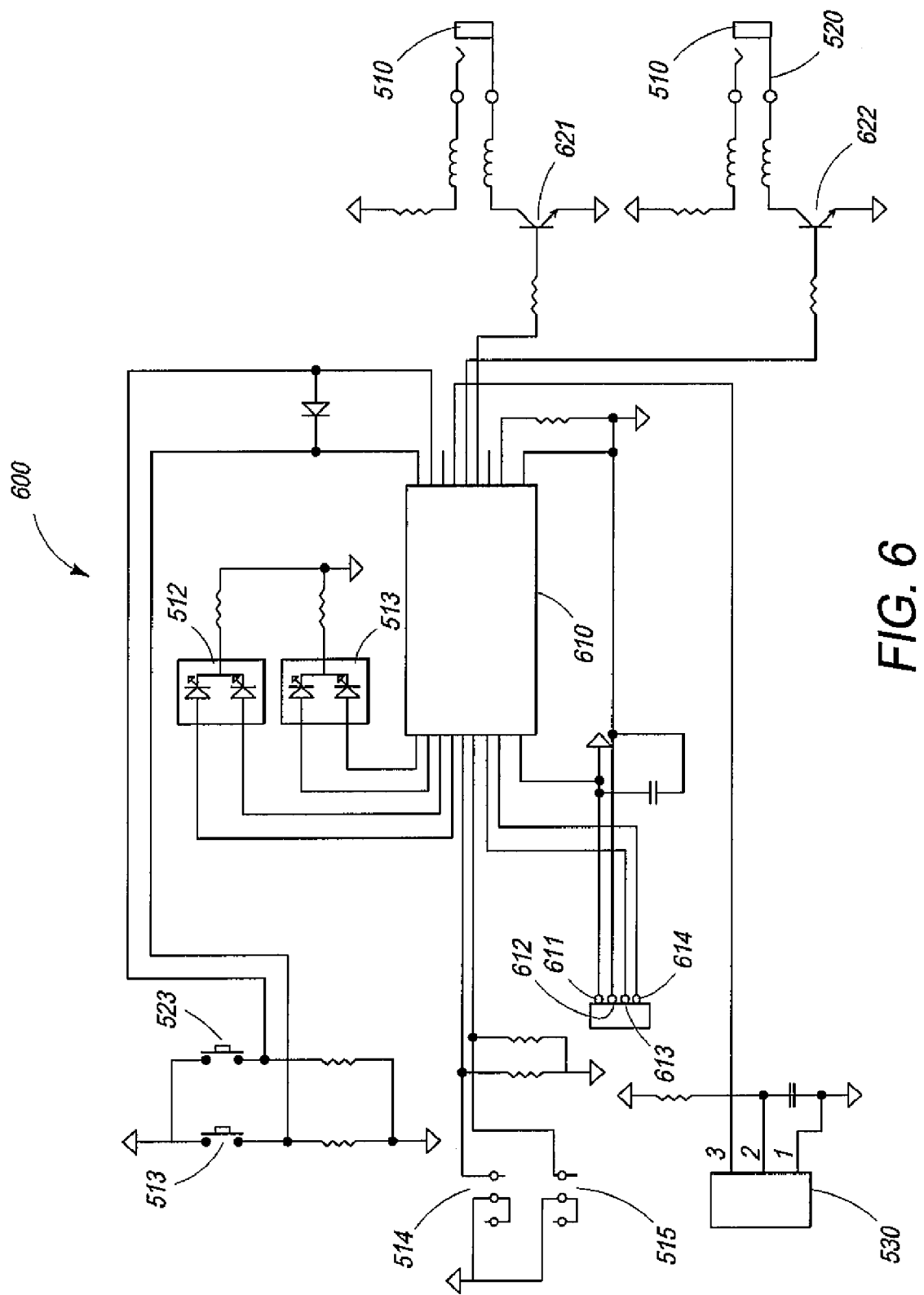
FIG. 6 is an electrical schematic of the circuit operative to provide the response of FIG. 2 as indicated by the steps shown in the flow charts of FIG. 3 and FIG. 4.

FIG. 6 illustrates the circuit through which microprocessor 610 is operative to be programmed via switch pairs 513/523 and 514/524 to ultimately provide the previously output of the first or second IR control signal via respective output ports 510 and 520. Further, microprocessor 610 is operative to receive UPS output signal at connections 611, 612, 613 and 614.

Microprocessor 610 is operative to provide power to the base of switching transistor 621, which in turns controls current flow to the IR output port 510. In a separate output trace, microprocessor 610 is operative to provide power to the base of switching transistor 622, which in turns controls current flow to the jack or IR output port 520. Further, microprocessor 610 is connected to operatively control the red and green LED's associate with status indicator 512 and 522.

In other embodiments of the invention it is desirable to pre-select a critical low battery shutoff threshold. This sets the battery capacity level at the point where the non-critical load outlets are turned off and all remaining battery power is reserved for equipment plugged into critical load outlets. This value is preferably stored internally in microprocessor 610 of the UPS.

While the invention has been described in connection with various preferred embodiments, it is not intended to limit the scope of the invention to the particular form set forth, but on the contrary, it is intended to cover such alternatives, modifications, and equivalents as may be within the spirit and scope of the invention as defined by the appended claims.

The invention claimed is:
1. A UPS comprising,
a battery,
a power input port, a power output port, operatively connected to said power input port, and to said battery when power at said power input point drops below a predetermined level, an IR signal output port, an IR signal input port, means to learn a signal pattern received at the IR input port, means to send the learned signal via the IR output port when power at said power input point drops below the predetermined level for a predetermined duration.

2. A UPS according to claim 1, further comprising means to send the learned signal via the output port in response to a predetermined remaining level of power in said battery after the power at the input port has dropped below a predetermined level such that said battery is providing power to the power output port.

3. A UPS according to claim 1, further comprising means to provide a variable delay time between the detection of a power failure and the sending of the learned signal via the IR signal output port.

4. A UPS according to claim 1, further comprising means to learn a second signal pattern received at the input port.

5. A UPS according to claim 4, further comprising a second IR signal output port for sending the second learned signal via the second IR output port when power at said power input point drops below the predetermined level for a predetermined duration.

6. A UPS device according to claim 4, further comprising means to send the first learned signal to a first powered device and means to send the second learned output signal to a second powered device.

7. A UPS device according to claim 5, further comprising means to vary the time of sending the first learned signal and the second learned signal.

8. A UPS according to claim 1 wherein the IR signal input port is a photo-detector.

9. A UPS according to claim 1 wherein the IR signal output port is a receptacle for providing power to a light emitting diode.

10. The method of claim 9 wherein the UPS is operative to transmit the previously entered signal at the IR output port in response to detecting a predetermined low back-up battery power level after the battery back-up operation of the UPS to power the A/V equipment.

11. A UPS according to claim 1 further comprising a light emitting diode connected to said IR signal output port via a cable.

12. A method of protecting A/V equipment from sudden loss of power or unsafe power condition, the method comprising the steps of:
   a) providing a UPS device having an IR input port, an IR output port with means to train the device to transmit a previously entered signal at the IR output port in response to detecting the battery back-up operation of the UPS to power the A/V equipment,
   b) providing an A/V device with an IR remote control port and a remote control device,
   c) powering the A/V equipment via UPS,
   d) training the UPS by exposing the output port of remote control to the IR input port of UPS,
   e) directing IR beam from the UPS in the line of sight with IR input port of A/V equipment.

13. The method of claim 12 further comprising the step of training the UPS by exposing the output port of a second remote control to IR input port of UPS.

14. A UPS according to claim 13 further comprising a light emitting diode connected to said IR signal output port via a cable.

15. A UPS according to claim 13 wherein said microprocessor is operative to send the learned signal via the IR output port when power at said power input point drops below a predetermined level for a predetermined duration.

16. A UPS according to claim 13 wherein said microprocessor is further operative to transmit the previously entered signal at the IR output port in response to detecting a predetermined low back-up battery power level after the battery back-up operation of the UPS to power the A/V equipment.

17. A UPS according to claim 13 wherein said microprocessor is further operative to;
   a) send the learned signal via the IR output port when power at said power input point drops below a predetermined level for a predetermined duration, and
   b) transmit the previously entered signal at the IR output port in response to detecting a predetermined low back-up battery power level after the battery back-up operation of the UPS to power the A/V equipment.

18. A UPS comprising,
   a) a battery,
   b) a power input port,
   c) a power output port, operatively connected to said power input port, and to said battery when power at said power input point drops below a predetermined level for a predetermined duration,
   d) an IR signal output port,
   e) an signal input port,
   f) a microprocessor operative to learn a signal pattern received at the IR input port,
   g) wherein the microprocessor is further operative to send the learned signal via the IR output port in response to a loss in power at the power input port.

19. A UPS according to claim 18 wherein the IR signal input port is a photo-detector.

20. A UPS according to claim 18 wherein the IR signal output port is a receptacle for providing power to a light emitting diode.

* * * * *